(12) United States Patent
Kuwamura et al.

(10) Patent No.: US 10,385,714 B2
(45) Date of Patent: Aug. 20, 2019

(54) SEAL STRUCTURE AND ROTARY MACHINE

(71) Applicant: MITSUBISHI HITACHI POWER SYSTEMS, LTD., Kanagawa (JP)

(72) Inventors: Yoshihiro Kuwamura, Tokyo (JP); Kazuyuki Matsumoto, Tokyo (JP); Hiroharu Oyama, Tokyo (JP); Yoshinori Tanaka, Tokyo (JP); Toyoharu Nishikawa, Tokyo (JP); Hidekazu Uehara, Tokyo (JP); Shin Nishimoto, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 258 days.

(21) Appl. No.: 15/039,580

(22) PCT Filed: Nov. 26, 2014

(86) PCT No.: PCT/JP2014/081181
§ 371 (c)(1),
(2) Date: May 26, 2016

(87) PCT Pub. No.: WO2015/083588
PCT Pub. Date: Jun. 11, 2015

(65) Prior Publication Data
US 2017/0022838 A1   Jan. 26, 2017

(30) Foreign Application Priority Data
Dec. 3, 2013   (JP) .................. 2013-250307

(51) Int. Cl.
*F01D 11/02* (2006.01)
*F01D 11/08* (2006.01)
(Continued)

(52) U.S. Cl.
CPC ............... *F01D 11/02* (2013.01); *F01D 5/12* (2013.01); *F01D 5/225* (2013.01); *F01D 11/08* (2013.01);
(Continued)

(58) Field of Classification Search
CPC .......... F16J 15/54; F16J 15/441; F16J 15/447; F16J 15/3288; F16J 15/4472; F01D 11/08; F01D 5/225; F01D 11/02; F01D 5/12
See application file for complete search history.

(56) References Cited

U.S. PATENT DOCUMENTS 3,572,728 A * 3/1971 Smuland ............... F01D 11/02
                                                      277/419
4,161,318 A * 7/1979 Stuart ..................... B23P 6/002
                                                      277/431
(Continued)

FOREIGN PATENT DOCUMENTS

CN     201851172     6/2011
CN     102695849     9/2012
(Continued)

OTHER PUBLICATIONS

Office Action dated Feb. 22, 2017 in corresponding Chinese patent application No. 201480065520.9 (with English translation).
(Continued)

*Primary Examiner* — Eugene G Byrd
(74) *Attorney, Agent, or Firm* — Wenderoth, Lind & Ponack, L.L.P.

(57) ABSTRACT

In a seal structure that seals a gap between a first structure and a second structure which faces the first structure in a radial direction and rotates relative to the first structure, one of the first structure and the second structure has a base surface and a step surface that protrudes toward the other side from the base surface, and the other is provided with:
(Continued)

a first fin which extends toward the step surface and forms a first gap between the step surface; a second fin that, on the downstream side of the first fin, extends toward the base surface and forms a second gap between the base surface; and a protrusion part that is disposed between the first fin and the second fin and that divides a leak flow, into a first vortex along the first fin and a second vortex along the second fin.

6 Claims, 5 Drawing Sheets

(51) Int. Cl.
  *F01D 5/22* (2006.01)
  *F16J 15/447* (2006.01)
  *F01D 5/12* (2006.01)
(52) U.S. Cl.
  CPC ....... *F16J 15/4472* (2013.01); *F05D 2220/31* (2013.01); *F05D 2220/32* (2013.01)

(56) References Cited

U.S. PATENT DOCUMENTS

| | | | | |
|---|---|---|---|---|
| 4,370,094 A * | 1/1983 | Ambrosch | ............ | F01D 11/08 415/119 |
| 4,420,161 A * | 12/1983 | Miller | .............. | F01D 25/04 277/418 |
| 4,662,820 A * | 5/1987 | Sasada | .............. | F04D 29/161 415/173.6 |
| 5,308,225 A * | 5/1994 | Koff | .............. | F01D 11/08 415/57.3 |
| 5,318,309 A * | 6/1994 | Tseng | .............. | F01D 11/02 277/347 |
| 5,496,045 A * | 3/1996 | Millener | .............. | F16J 15/3288 277/355 |
| 5,586,859 A * | 12/1996 | Nolcheff | .............. | F01D 11/08 415/173.1 |
| 5,607,284 A * | 3/1997 | Byrne | .............. | F01D 11/08 415/173.4 |
| 5,997,004 A * | 12/1999 | Braun | .............. | F16J 15/3288 277/352 |
| 6,068,443 A * | 5/2000 | Aoki | .............. | F01D 5/225 415/173.1 |
| 6,139,019 A * | 10/2000 | Dinc | .............. | F16J 15/3288 277/347 |
| 8,133,014 B1 * | 3/2012 | Ebert | .............. | F01D 11/025 415/173.3 |
| 8,807,927 B2 * | 8/2014 | Babu | .............. | F01D 11/122 415/173.5 |
| 2003/0035715 A1 * | 2/2003 | Torrance | .............. | F01D 11/08 415/58.5 |
| 2004/0223844 A1 * | 11/2004 | Farrell | .............. | F01D 5/225 415/170.1 |
| 2009/0243221 A1 * | 10/2009 | Olmes | .............. | F01D 11/08 277/411 |
| 2010/0143105 A1 * | 6/2010 | Goto | .............. | F04D 29/164 415/173.7 |
| 2011/0085892 A1 * | 4/2011 | John | .............. | F01D 11/10 415/171.1 |
| 2012/0043728 A1 * | 2/2012 | Zeng | .............. | F01D 11/001 277/412 |
| 2012/0288360 A1 * | 11/2012 | Kuwamura | .............. | F01D 5/225 415/173.1 |
| 2012/0321449 A1 * | 12/2012 | Matsumoto | .............. | F01D 11/08 415/173.6 |
| 2013/0094945 A1 * | 4/2013 | Kuwamura | .............. | F01D 11/02 415/173.1 |
| 2013/0243600 A1 * | 9/2013 | Noble | .............. | F01D 5/147 416/204 R |
| 2013/0272888 A1 * | 10/2013 | Chouhan | .............. | F01D 5/225 416/223 R |
| 2014/0020403 A1 * | 1/2014 | Tsukuda | .............. | F01D 11/001 60/805 |
| 2014/0119901 A1 * | 5/2014 | Shibata | .............. | F01D 11/08 415/173.1 |

FOREIGN PATENT DOCUMENTS

| | | |
|---|---|---|
| JP | 11-148307 | 6/1999 |
| JP | 2003-035106 | 2/2003 |
| JP | 2005-180278 | 7/2005 |
| JP | 2006-104952 | 4/2006 |
| JP | 2006-291967 | 10/2006 |
| JP | 2008-196522 | 8/2008 |
| JP | 2011-208602 | 10/2011 |
| JP | 2012-72689 | 4/2012 |
| JP | 2011-012631 | 8/2012 |
| KR | 10-2012-0092161 | 8/2012 |

OTHER PUBLICATIONS

International Search Report dated Jan. 13, 2015 in International Application No. PCT/JP2014/081181 (with English translation).
Written Opinion of the International Search Authority dated Jan. 13, 2015 in International Application No. PCT/JP2014/081181 (with English translation).

* cited by examiner

SEAL STRUCTURE AND ROTARY MACHINE

TECHNICAL FIELD

The present invention relates to a seal structure which seals the gap between structures that rotate relative to each other in a rotary machine such as a steam turbine and a gas turbine, and to a rotary machine that is provided with this seal structure.

Priority is claimed on Japanese Patent Application No. 2013-250307, filed Dec. 3, 2013, the contents of which are incorporated herein by reference.

BACKGROUND ART

In a rotary machine such as a steam turbine and a gas turbine, there is used a non-contact type seal structure such as a labyrinth seal, in order to prevent leakage of a working fluid such as steam from a gap formed between the stationary side and rotor side.

As a labyrinth seal there is known a step-type labyrinth seal in which, on an inner circumference of a casing that serves as an outer shell of a rotary machine, there are provided seal members such as seal fins that extend toward rotor blades, and there is provided a step-shaped shroud provided on the tip end of the rotor blades (for example, refer to Patent Document 1).

Figure 7:
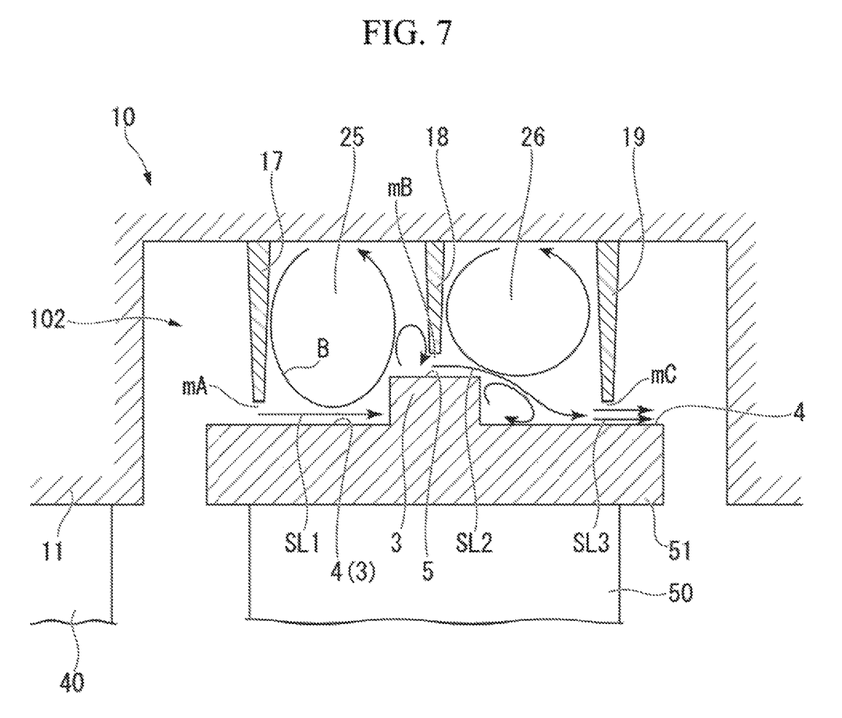
FIG. 7 is a schematic diagram for describing the behavior of leak jets and vortices in a conventional annular grooved seal structure.

As shown in FIG. 7, a step-type labyrinth seal 102 includes; a plurality of seal fins 17, 18, and 19 that extend from a casing 10, and a step part 3 formed on a shroud 51 which is provided on the tip end part of a rotor blade 50. The labyrinth seal 102 is configured of an upstream side cavity 25 that is formed by a front-facing step, and a downstream side cavity 26 that is formed by a rear-facing step.

Within the upstream side cavity 25 formed by a front-facing step, a leak jet SL which has traveled through an upstream gap mA between an upstream seal fin 17 and a base surface 4 of the shroud 51, forms a vortex B while colliding with an upstream side surface of the step part 3, thereby deflecting the leak jet SL. As a result, blow-by of a leak jet SL2 into an intermediate gap mB between an intermediate seal fin 18 and the step part 3 is suppressed and the amount of leakage is reduced.

PRIOR ART DOCUMENTS

Patent Documents

[Patent Document 1] Japanese Unexamined Patent Application, First Publication No. 2006-104952

SUMMARY OF INVENTION

Problems to be Solved by the Invention

On the other hand, within the downstream side cavity 26 formed by a rear-facing step, the reattachment point of the leak jet SL2 which has traveled through the intermediate gap mB becomes unstable, and sealing performance becomes unstable. In particular, in the case where the reattachment point is positioned on the base surface 4 of the shroud 51, the flow rate of a leak jet SL3 traveling through a downstream gap mC becomes high, and the leakage amount increases.

An object of the present invention is to provide a rotary machine that reduces the leak jet which leaks from the gap formed between the stationary side and the rotor side, to thereby stabilize sealing performance.

Means for Solving the Problem

According to a first aspect of the present invention, a seal structure is a seal structure that seals a gap between a first structure and a second structure which faces the first structure in a radial direction and rotates relative to the first structure about an axis, wherein one of the first structure and the second structure has a base surface and a step surface that protrudes toward the other side from the base surface, and the other is provided with: a first fin which extends toward the step surface and forms a first gap at a space with respect to the step surface; a second fin that, on a downstream side of the first fin, extends toward the base surface and forms a second gap at a space with respect to the base surface; and a protrusion part that is disposed between the first fin and the second fin and that divides a leak flow which has passed through the first gap, into a first vortex along the first fin and a second vortex along the second fin.

According to the above configuration, a leak flow that has passed through the first gap is divided by the protrusion part into a first vortex and a second vortex, and the leak flow is restrained from being reattached on the base surface, thereby reducing the amount of leak flow traveling into the second gap. As a result, sealing performance can be stabilized.

In the seal structure, the protrusion part may be of a configuration such that, between a downstream side end part of the step surface and the second fin in the axial direction, and between the step surface and the other structure in the radial direction, there is provided a reattachment edge that extends in the circumferential direction and causes the leak flow to be reattached thereon.

According to the above configuration, the leak flow that has passed through the first gap can be stably reattached on the reattachment edge of the protrusion part.

In the seal structure, the protrusion part may be a member which include; a circular surface that is connected to an upstream side of the second fin and that extends in between the other structure and the reattachment edge, and a cylindrical surface that is of a cylinder-shaped surface concentric with the axis, which extends in between the reattachment edge and the second fin, the member having a rectangular shape when viewed from the circumferential direction.

In the seal structure, the protrusion part may be a member that is connected to an upstream side surface of the second fin and that is of a cylindrical shape concentric with the axis, extending in between the reattachment edge and the second fin.

According to the above configuration, the first vortex on the downstream side of the first fin becomes greater and the vorticity of the first vortex becomes lower, causing a rise in static pressure. As a result, a pressure difference between before and after the first fin becomes small. Thereby, the amount of leakage can be further reduced.

In the seal structure, the protrusion may be a disk-shaped member that extends in between the other structure and the reattachment edge.

According to the above configuration, a vortex is generated on the downstream side of the protrusion, and kinetic energy is dissipated into heat due to the mixing loss within the vortex, resulting in a total pressure loss. As a result, the amount of leakage can be further reduced.

Moreover, the present invention provides a rotary machine that is provided with any one of the above seal structures.

Effect of the Invention

According to the present invention, the leak flow that has passed through the first gap is divided by the protrusion part into a first vortex and a second vortex, and the leak flow is restrained from being reattached on the base surface, thereby reducing the amount of leak flow traveling into the second gap. As a result, sealing performance can be stabilized.

MODES FOR CARRYING OUT THE INVENTION

First Embodiment

Hereinafter, a steam turbine which is a rotary machine of a first embodiment of the present invention is described based on the drawings.

Figure 1:
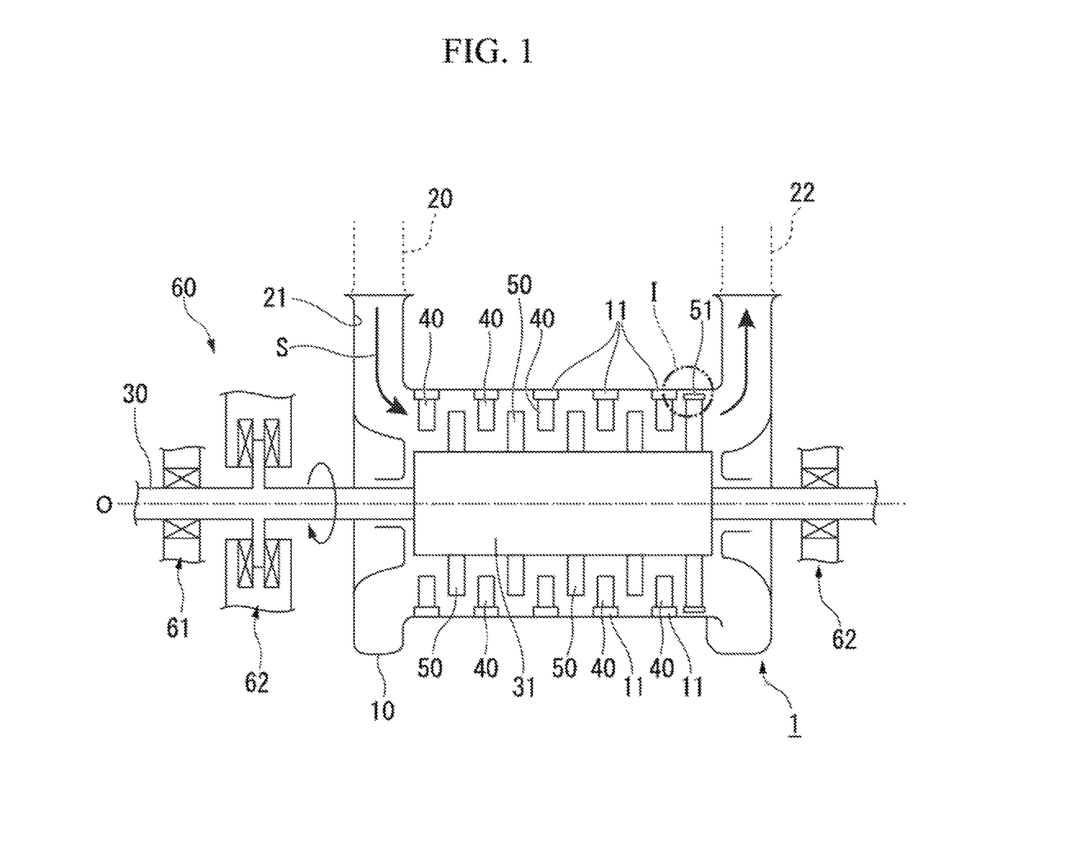
FIG. 1 is a crass-sectional view showing a schematic configuration of a steam turbine according to a first embodiment of the present invention.

As shown in FIG. 1, a steam turbine 1 of the present embodiment is provided with; a casing 10 (structure), a rotation shaft 30 that is provided rotatably within the casing 10, and that transmits power to a machine such as a power generator (not shown in the figure), turbine vanes 40 held on the casing 10, turbine blades 50 provided on the rotation shaft 30, and a bearing part 60 that supports the rotation shaft 30 so as to be rotatable about the axis.

Steam S is introduced via a steam supply pipe 20 connected to a steam supply source (not shown in the figure), from a main intake port 21 formed in the casing 10, and is discharged from a steam discharge pipe 22 connected to the downstream side of the steam turbine 1.

The turbine vanes 40 and the turbine blades 50 are blades that extend in the radial direction of the axis C. The casing 10 is a structure that the turbine blades 50 rotate therein relative to about the axis O.

The interior space of the casing 10 is sealed airtight. The casing 10 is a flow passage of steam S. On the inner wall surface of the casing 10 there are tightly fixed ring-shaped partition plate outer rings 11, into which the rotation shaft 30 is to be inserted.

The bearing part 60 is provided with a journal bearing device 61 and a thrust bearing device 62, and it rotatably supports the rotation shaft 30.

The turbine vanes 40 extend from the casing 10 toward the inner circumferential side and form a group of ring-shaped turbine vanes, in which a number of the turbine blades are arranged in a radial manner so as to surround the rotation shaft 30. The several turbine vanes 40 are held by the partition plate outer rings 11 respectively.

The group of ring-shaped turbine vanes including the several turbine vanes 40 are formed in several positions while having intervals therebetween in the axial direction of the rotation shaft 30 (hereunder, referred to simply as the axial direction). These several turbine vanes 40 convert pressure energy of steam S into velocity energy, and cause it to flow into the turbine blades 50 adjacent thereto on the downstream side.

The turbine blades 50 are tightly fitted to the outer circumference part of the rotation shaft main body 31 of the rotation shaft 30. The turbine blades 50, on the downstream side of each of the ring-shaped turbine vanes, are arranged in a radial manner at several positions sc as to form a group of ring-shaped turbine blades.

The ring-shaped turbine vane group and the ring-shaped turbine blade group are such that one set of each serves as one stage. Among these, the tip end parts of the turbine blades 50 on the final stage are such that the tip end parts of the turbine blades adjacent to each other in the circumferential direction of the rotation shaft 30 (hereunder, referred to simply as circumferential direction) are connected to each other, and are referred to as a shroud 51.

Figure 2:
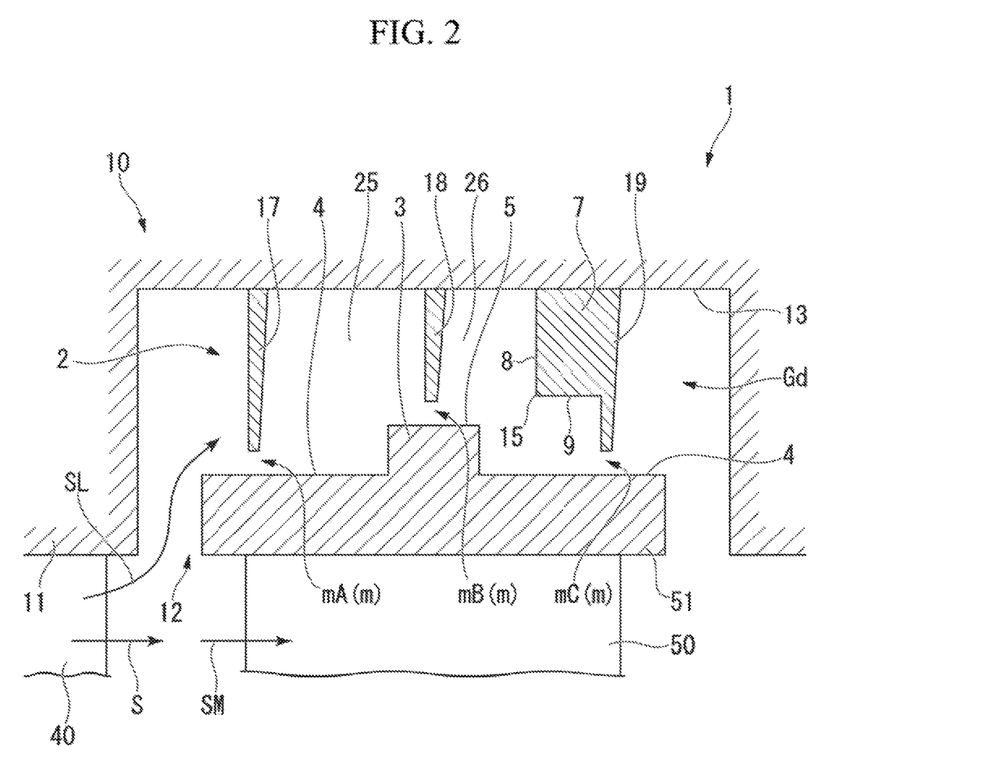
FIG. 2 is an enlarged cross-sectional view of a relevant part of the steam turbine according to the first embodiment of the present invention.

As shown in FIG. 2, on the downstream side in the axial direction of the partition plate outer ring 11, there is formed a cylindrical annular groove 12, in which the diameter increases from the inner circumference part of the partition plate outer ring 11, and the inner circumferential surface of the casing 10 serves as a bottom surface 13 (opposing surface). In the annular groove 12 there is accommodated the shroud 51, and the bottom surface 13 opposes the shroud 51 via a gap Gd in the radial direction.

The shroud 51 is provided with a step part 3 which is formed in a step shape and protrudes from an axially center portion of the shroud 51. Specifically, the surface of the shroud 51 on the radially outer circumferential side has; a base surface 4 (tip end surface), and the step part 3 that forms a step surface 5 protruding from the base surface 4 toward the outer circumference side in the radial direction.

On the bottom surface 13 there are provided three seal fins 17, 18, and 19 respectively extending in the radial direction toward the shroud 51. The seal fins 17, 18, and 19 respectively extend from the bottom surface 13 to the inner circumferential side toward the shroud 51, and extend in the circumferential direction.

Specifically, the upstream seal fin 17 protrudes toward the base surface 4 on the upstream side of the step part 3. The intermediate seal fin 18 (first fin) protrudes toward the step surface 5 of the step part 3. The downstream seal fin 19 (second fin) protrudes toward the base surface 4 on the downstream side of the step part 3. The intermediate seal fin 18 is formed so that the length thereof in the radial direction is shorter than that of the upstream seal fin 17 and the downstream seal fin 19.

That is to say, in the gap Gd between the casing 10 and the turbine blades 50 of the present embodiment, there is provided a seal structure 2, which is a step-type labyrinth seal.

These seal fins 17, 18, and 19 form minute gaps m at the space with respect to the shroud 51. Hereinafter, the gap between the upstream seal fin 17 and the base surface 4 is referred to as an upstream gap mA, the gap between the intermediate seal fin 18 and the step surface 5 is referred to as an intermediate gap mB (first gap), and the gap between the downstream seal fin 19 and the base surface 4 is referred to as a downstream gap mC (second gap).

The respective dimensions of the minute gaps m (mA through mC) take into consideration the amount of thermal expansion of the casing 10 and the turbine blade 50, as well as the amount of centrifugal expansion of the turbine blade 50. The respective dimensions of the minute gaps m (mA through mC) are set within a range where the seal fins 17, 18, and 19 do not to come in contact with the turbine blades 50.

In the gap Gd, an upstream side cavity 25 and a downstream side cavity 26 are formed by the annular groove 12, the shroud 51, and the seal fins 17, 18, and 19. The positions of the seal fins 17, 18, and 19 in the axial direction are appropriately set according to the behavior of the leak jets and vortices within these cavities 25 and 26.

On the upstream side of the downstream seal fin 19 there is integrally attached a protrusion 7 (protrusion part). The protrusion 7 is a solid member, the sectional shape of which is rectangular when viewed from the circumferential direction, and it extends in the circumferential direction along with the downstream seal fin 19.

The protrusion 7 has a circular surface 8, which is oriented orthogonal to the axial direction on the upstream side of the downstream seal fin 19, and a cylindrical surface 9, which is of a cylinder-shaped surface concentric with the axis, and which extends in the circumferential direction while being orthogonal to the circular surface 8. The ridge line at which the circular surface 8 and the cylindrical surface 9 intersect with each other, serves as a reattachment edge 15. In other words, the circular surface 8 and the cylindrical surface 9 are surfaces that determine the position of the reattachment edge 15.

The circular surface 8 is positioned in the axial direction between the downstream side end part of the step surface 5 and the downstream seal fin 19. Specifically, the circular surface 8 is arranged based on the position of the reattachment edge 15, which is determined by means of a method described later.

The cylindrical surface 9 is positioned in the radial direction between the step surface 5 and the bottom surface 13 of the annular groove 12. Specifically, the cylindrical surface 9 is arranged based on the position of the reattachment edge 15.

Here, an operation of the steam turbine 1 that is configured in the manner described above is described.

First, steam S flows into the interior space of the casing 10 via the steam supply pipe 20, from a steam supply source such as a boiler (not shown in the figure).

The steam S which has flowed into the interior space of the casing 10 travels sequentially through the ring-shaped turbine vane group and the ring-shaped turbine blade group in each stage.

In the ring-shaped turbine vane group of each stage, the steam S gets the circumferential velocity component thereof increased while traveling through the turbine vanes 40. Steam SM which is the majority portion of this steam S (refer to FIG. 2) flows into the spaces between the turbine blades 50, and the energy of the steam SM is convened into rotational energy thereby causing the rotation shaft 30 to rotate.

On the other hand, a leak jet SL (leakage flow, or leak flow), which is a portion of the steam S (for example, only a few percent approximately), after having flowed out from the turbine vanes 40, flows into the annular groove 12 while maintaining its strong circumferential direction component (swirl flow).

Figure 3:
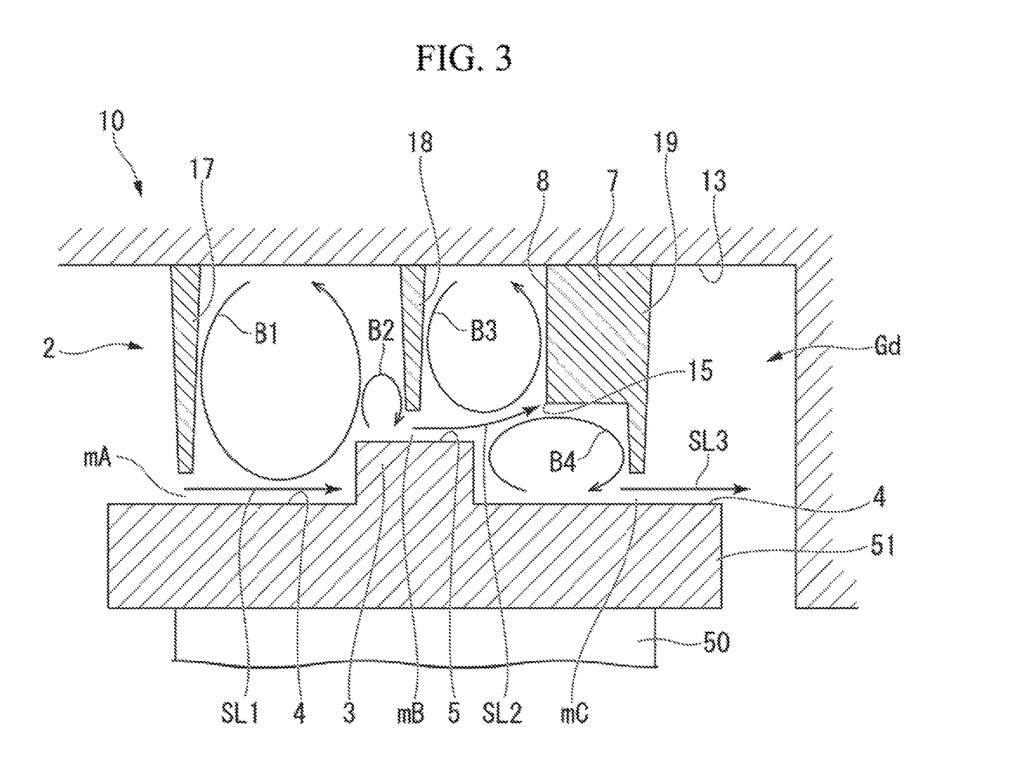
FIG. 3 is a schematic diagram for describing the behavior of leak jets and vortices in the seal structure of the first embodiment of the present invention.

As shown in FIG. 3, the leak jet SL collides with the upstream-side-facing surface of the step part 3 and is deflected while forming a vortex B1. As a result, the amount of leakage of the leak jet SL into the intermediate gap mB is reduced.

A leak jet SL2 that has passed through the intermediate gap mB stably becomes reattached on the reattachment edge 15 of the protrusion 7 provided on the downstream side. That is to say, the reattachment point of the leak jet SL2 is controlled, and a vortex B3 (first vortex) is formed in a space surrounded by the leak jet SL, the intermediate seal fin 18, and the circular surface 8, while a vortex B4 (second vortex) is formed in a space surrounded by the leak jet SL2, the cylindrical surface 9, and the base surface 4. In other words, the leak jet SL2 is divided by the protrusion 7 into the vortex B3 along the intermediate seal fin 18 and the vortex B4 along the downstream seal fin 19.

Thereby, the leak jet SL2 is restrained from being reattached on the bottom surface 13 and the base surface 4 (step part 3).

Figure 4:
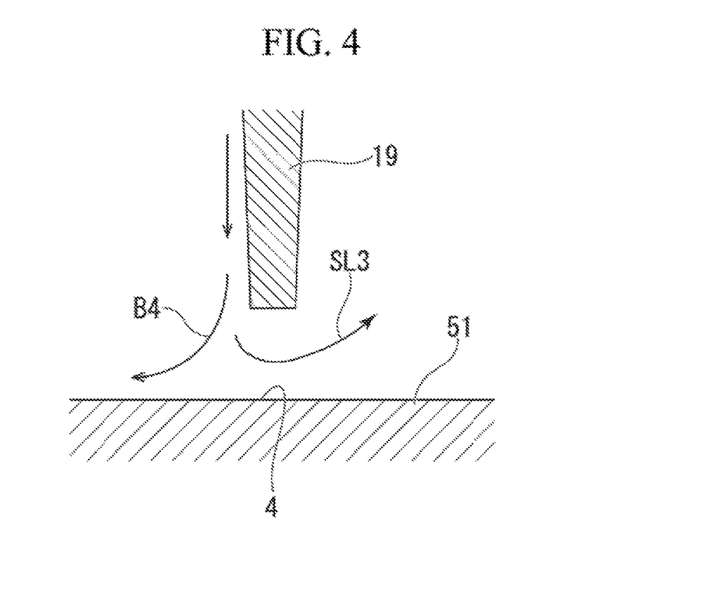
FIG. 4 is a diagram for describing in detail the behavior of a leak jet passing through a downstream gap between a downstream seal fin and a base surface in the seal structure of the first embodiment of the present invention.

As shown in FIG. 4, the vortex B4 becomes a flow that opposes the leak jet SL3 which collides with the downstream seal fin 19 and passes through the downstream gap mC, and therefore the leak jet SL3 is reduced.

Next, a method of determining the position of the reattachment edge 15 is described.

The position of the reattachment edge 15 is set to a position where the leak jet SL2 having passed through the intermediate gap mB is likely to be reattached. The reattachment edge 15 of the present embodiment is set in the close vicinity of a midpoint, in the axial direction, between the downstream side end of the step surface 5 and the downstream seal fin 19, and is positioned in the radial direction, slightly to the radially outer circumferential side of the step surface 5.

The position of the reattachment edge 15 is appropriately calculated by means of analysis using computational fluid dynamics (CFD), according to the specifications of the steam turbine 1 such as the clearance between the shroud 51 and the bottom surface 13, and the flow rate of swirl flow flowing into the cavities 25 and 26.

When the steam turbine 1 is operating, a difference in the expansion amount of each part occurs due to the difference in materials used in the respective parts that constitute the steam turbine 1, and/or the difference in temperatures to which the respective parts are exposed. As a result, the relative positions between the rotation shaft 30 and the casing 10 in the axial direction change.

The reattachment edge 15 is set so that even in this type of case where the relative positions between the rotation shaft 30 and the casing 10 have changed, the reattachment edge 15 will not be in a position where it opposes the step surface 5 in the radial direction. In other words, the protrusion 7 is set so that the reattachment edge 15 always opposes the base surface 4 in the radial direction.

According to the embodiment above, the leak jet SL2 that has passed through the intermediate gap mB stably becomes reattached on the reattachment edge 15 of the protrusion 7. That is to say, the leak jet SL2 is restrained from being reattached on the base surface 4, and the flow of the leak jet SL3 traveling into the downstream gap mC is reduced, thereby enabling stable sealing performance. In particular, it is possible to reduce the flow rate of the leak jet SL3 by means of the vortex B4, which is formed as a result of the leak jet SL2 reattaching on the reattachment edge 15 of the protrusion 7.

The circular surface 8 of the present embodiment is formed so that the principal surface thereof is oriented orthogonal to the axis O. However, it is not limited to this as long as the set position of the reattachment edge 15 can be maintained. For example, the circular surface 8 may be of a shape that slopes toward the upstream side with approach to the radially outer circumferential side.

Similarly, the cylindrical surface 9 may also be of a shape that slopes toward the radially inner circumferential side with approach to the downstream side.

Moreover, the protrusion 7 may be of a hollow structure, rather than being a solid structure.

Second Embodiment

Hereinafter, a seal structure of a steam turbine of a second embodiment of the present invention is described, based on the drawings. In the present embodiment, points that differ from the first embodiment described above are mainly described, and descriptions of similar portions are omitted.

Figure 5:
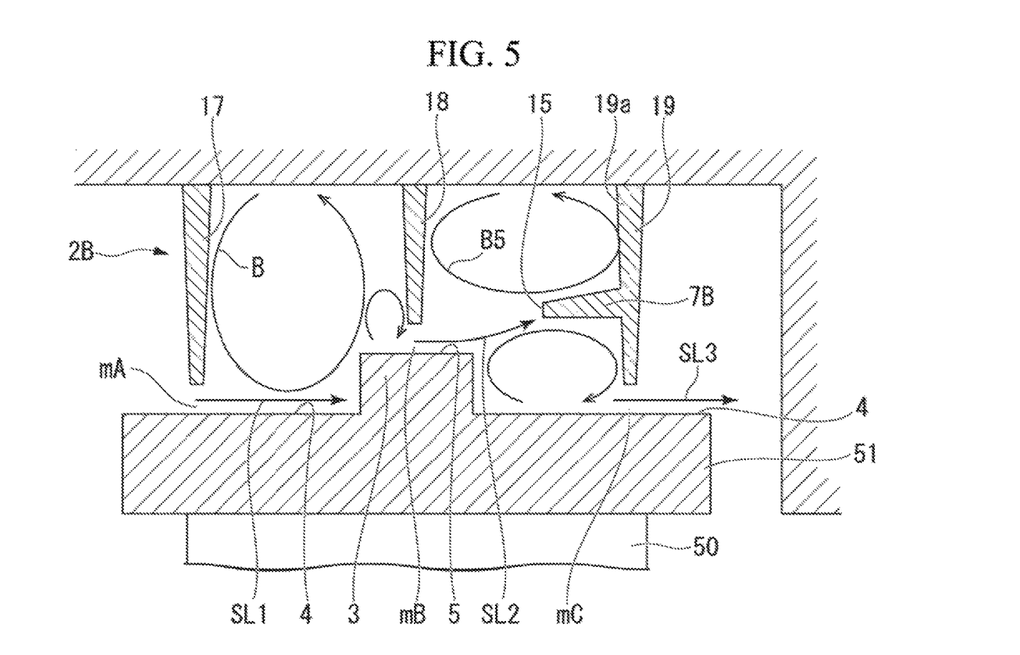
FIG. 5 is a schematic diagram for describing the behavior of leak jets and vortices in a seal structure of a second embodiment of the present invention.

As shown in FIG. 5, a protrusion 7B of a seal structure 2B of the present embodiment is a cylindrical member that protrudes from an upstream side surface 19a of a downstream seal fin 19 toward the upstream side, and that extends in the circumferential direction. In other words, the protrusion 7B is a cylindrical member being concentric with the axis O (refer to FIG. 1), that is connected to the upstream side surface 19a of the downstream seal fin 19, and extends between a reattachment edge 15 and the downstream seal fin 19.

A leak jet SL2 that has passed through the intermediate gap mB becomes reattached on the reattachment edge 15, which is the most upstream side end part of the protrusion 7B, and a large vortex B5 is generated on the downstream side of the intermediate seal fin 18.

According to the embodiment above, the vortex B5 on the downstream side of the intermediate seal fin 18 becomes larger and the vorticity of the vortex B5 becomes lower, causing a rise in static pressure. Hence the pressure difference between before and after the intermediate seal fin 18 becomes small. As a result, the amount of leakage can be further reduced, in addition to the effect of the steam turbine 1 of the first embodiment.

Third Embodiment

Hereinafter, a seal structure of a steam turbine of a third embodiment of the present invention is described, based on the drawings. In the present embodiment, points that differ from the first embodiment described above are mainly described, and descriptions of similar portions are omitted.

Figure 6:
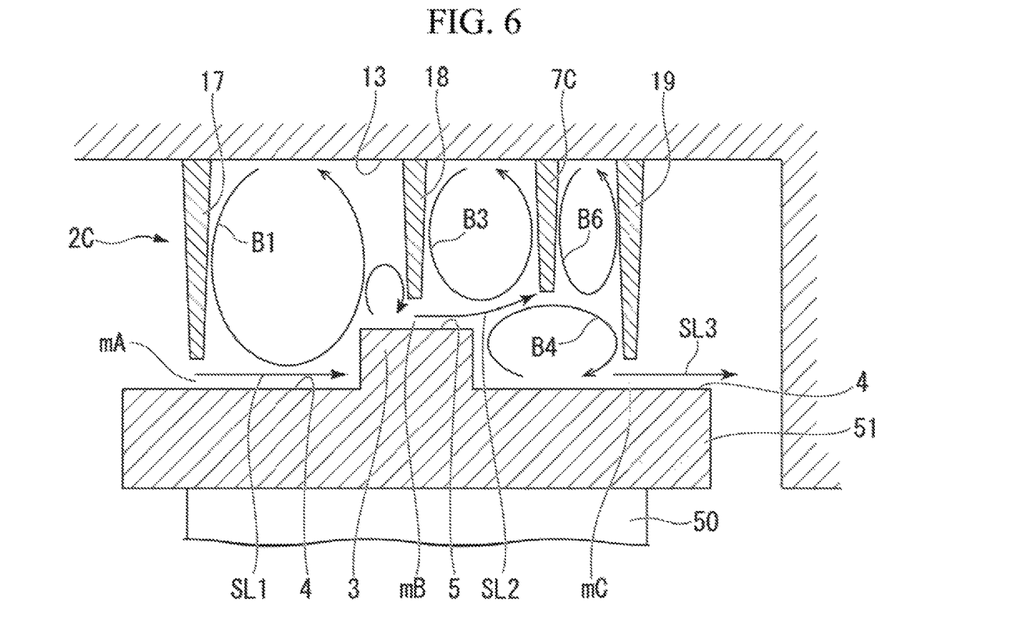
FIG. 6 is a schematic diagram for describing the behavior of leak jets and vortices in a seal structure of a third embodiment of the present invention.

As shown in FIG. 6, a protrusion 7C of a seal structure 2C of the present embodiment is a disk-shaped member that is arranged between an intermediate seal fin 18 and a downstream seal fin 19, and that extends in the radial direction from a bottom surface 13 of an annular groove 12 toward a base surface 4 of the shroud 51. In other words, the protrusion 7C of the present embodiment is a disk-shaped member that extends in between the bottom surface 13 of the annular groove 12 and a reattachment edge 15.

A leak jet SL2 that has passed through the intermediate gap mB becomes reattached on the reattachment edge 15, which is the most upstream side end part of the protrusion 7C, and a vortex B6 is further generated on the downstream side of the protrusion 7C.

According to the embodiment above, the vortex B6 is generated on the downstream side of the protrusion 7C, and kinetic energy is dissipated into heat due to the mixing loss within the vortex, resulting in a total pressure loss. As a result, the amount of leakage can be further reduced in addition to the effect of the first embodiment.

The embodiments of the present invention have been described with reference to the drawings. However, the respective configurations in the respective embodiments and combinations thereof are merely examples, and addition, omission, replacement, and/or other modifications may be made to the configuration without departing from the scope of the invention. Moreover, the present invention is not to be considered limited by the embodiments, but only by the scope of the appended claims.

For example, in each embodiment above, a labyrinth seal is configured with a step part 3 of the shroud 51 provided on the tip end side (rotation side) of the turbine blade 50, and seal fins 17, 18, and 19 provided on the bottom surface 13 of the annular groove 12 (stationary side). However, the configuration is not limited to this. For example, the configuration may be such that seal fins are provided on the turbine blade side, which is the rotation side, and a step part is provided on the annular groove 12 (casing), which is on the stationary side.

Moreover, the invention may be applied to a labyrinth seal that seals the gap between the casing and the rotation shaft with no turbine blades provided thereon. For example, the invention may be applied to a shaft seal between a turbine casing and rotors, a seal between blades and a casing of an axial flow compressor, and a seal between a centrifugal compressor casing and an impeller.

In other words, the seal structure of each embodiment above may be applied to a rotary machine that is provided with: a second structure that faces a first structure in the radial direction via a gap and rotates relative to the first structure about the axis; and a plurality of seal fins that are provided on either one of the first structure and the second structure, and that protrude toward the other structure and form minute gaps at the space with respect to the other structure while being provided at intervals in the axial direction.

INDUSTRIAL APPLICABILITY

According to the seal structure, a leak flow that has passed through the first gap is divided by the protrusion part into a first vortex and a second vortex, and the leak flow is restrained from being reattached on the base surface, thereby reducing the amount of leak flow traveling into the second gap. As a result, sealing performance can be stabilized.

DESCRIPTION OF REFERENCE SYMBOLS

1 Steam turbine (rotary machine)
2, 2B, 2C Seal structure
3 Step part
4 Base surface
5 Step surface
7 Protrusion (protrusion part)

8 Circular surface
9 Cylindrical surface
10 Casing (first structure, second structure)
11 Partition plate outer ring
12 Annular groove
13 Bottom surface
15 Reattachment edge
17 Upstream seal fin
18 Intermediate seal fin (first fin)
19 Downstream seal fin (second fin)
25 Upstream side cavity
26 Downstream side cavity
30 Rotation shaft
31 Axis main body
32 Disk
40 Turbine Vane (blade)
50 Turbine blade (blade)
51 Shroud (first structure, second structure)
60 Bearing part
61 Journal bearing device
62 Thrust bearing device
B3 Vortex (first vortex)
B4 Vortex (second vortex)
Gd Gap
mA Upstream gap
mB Intermediate gap (first gap)
mC Downstream gap (second gap)
O Axis
SL Leak jet (leak flow)

The invention claimed is:

1. A seal structure for sealing a gap between a first structure and a second structure which faces the first structure in a radial direction and rotates relative to the first structure about an axis, wherein
one of the first structure and the second structure has a base surface and a step surface that protrudes toward the other of the first and second structures from the base surface, wherein the base surface is located at a downstream side with respect to the step surface,
wherein the other of the first and second structures is provided with:
a first fin which extends toward the step surface and forms a first gap at a space with respect to the step surface; and
a second fin that, on a downstream side of the first fin, extends toward the base surface and forms a second gap at a space with respect to the base surface;
a protrusion part that is disposed between the first fin and the second fin and that divides a leak flow which has passed through the first gap, into a first vortex along the first fin and a second vortex along the second fin,
and wherein the protrusion part is integrally attached to the upstream side of the second fin, the sectional shape of the protrusion part is rectangular when viewed from the circumferential direction, and includes a circular surface which is orthogonal to the axis, a cylindrical surface which is concentric with the axis and extending in the circumferential direction while being orthogonal to the circular surface, and a reattachment edge of which a position is determined by the circular surface and the cylindrical surface,
wherein the reattachment edge extends in the circumferential direction and causes the leak flow to be reattached thereon, wherein the reattachment edge is provided in a position between a downstream side end part of the step surface and the second fin in the axial direction, and between the step surface and the other structure in the radial direction, and
the reattachment edge is set between the base surface of one of the first and second structures and the base surface of the other of the first and second surfaces, and
the reattachment edge is positioned between the downstream side end part of the step surface and the second fin in the axial direction, and is positioned close to the other of the first and second structures with respect to the step surface in the radial direction.

2. The seal structure according to claim 1, wherein the protrusion part includes a circular surface that is connected to an upstream side of the second fin and that extends in between the other of the first and second structures and the reattachment edge, and a cylindrical surface that is of a cylinder-shaped surface concentric with the axis, which extends in between the reattachment edge and the second fin, wherein the protrusion part has a rectangular shape when viewed from the circumferential direction.

3. The seal structure according to claim 1, wherein the protrusion part is a member that is connected to an upstream side surface of the second fin and that is of a cylindrical shape concentric with the axis, extending in between the reattachment edge and the second fin.

4. The seal structure according to claim 1, wherein the protrusion part is a disk-shaped member that extends in between the other of the first and second structures and the reattachment edge.

5. A rotary machine comprising a seal structure according to claim 1.

6. The seal structure according to claim 2, wherein an edge between the step surface and the base surface on a downstream side of the step surface is positioned between the first and second fins and close to the reattachment edge of the protrusion part,
an upstream side cavity is defined so as to be surrounded by the first fin, the circular surface of the protrusion part, and the step surface,
a downstream side cavity is defined so as to be surrounded by the cylindrical surface of the protrusion part, the second fin, and the base surface on the downstream side of the step surface, and
the leak flow is divided into the first vortex generated in the upstream side cavity and the second vortex generated in the downstream side cavity.

* * * * *